United States Patent
Narita

(10) Patent No.: US 6,418,168 B1
(45) Date of Patent: Jul. 9, 2002

(54) MOTION VECTOR DETECTION APPARATUS, METHOD OF THE SAME, AND IMAGE PROCESSING APPARATUS

(75) Inventor: Hideyuki Narita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/534,430

(22) Filed: Mar. 23, 2000

(30) Foreign Application Priority Data

Mar. 24, 1999 (JP) .......................................... 11-079387

(51) Int. Cl.$^7$ ................................................ H04N 7/12
(52) U.S. Cl. ............................. 375/240.16; 375/240.23
(58) Field of Search ...................... 375/240.16, 240.03, 375/240.12, 240.15, 240.18, 240.2, 240.22; 348/699, 407, 413, 414, 415, 416, 417; 382/232, 236, 238, 239, 244; H04N 7/12

(56) References Cited

U.S. PATENT DOCUMENTS

| | | | | |
|---|---|---|---|---|
| 5,793,429 A | * | 8/1998 | Kim et al. | 375/240.17 |
| 5,905,542 A | * | 5/1999 | Linzer | 348/699 |
| 6,157,677 A | * | 12/2000 | Martens et al. | 375/240.16 |
| 6,222,887 B1 | * | 4/2001 | Nishikawa et al. | 375/240.26 |

* cited by examiner

*Primary Examiner*—Nhon Diep
(74) *Attorney, Agent, or Firm*—Frommer Lawrence & Haug LLP; William S. Frommer

(57) ABSTRACT

A control circuit specifies a first search area by using a motion vector found in units of macroblocks between a plurality of frames located previous to first frame, specifies a second search area by using a simplified motion vector indicating the motion of an image between the first frame, the second frame, and a frame located in time between the first frame and the second frame, and designates a search area by switching the first search area and the second search area suitably.

17 Claims, 15 Drawing Sheets

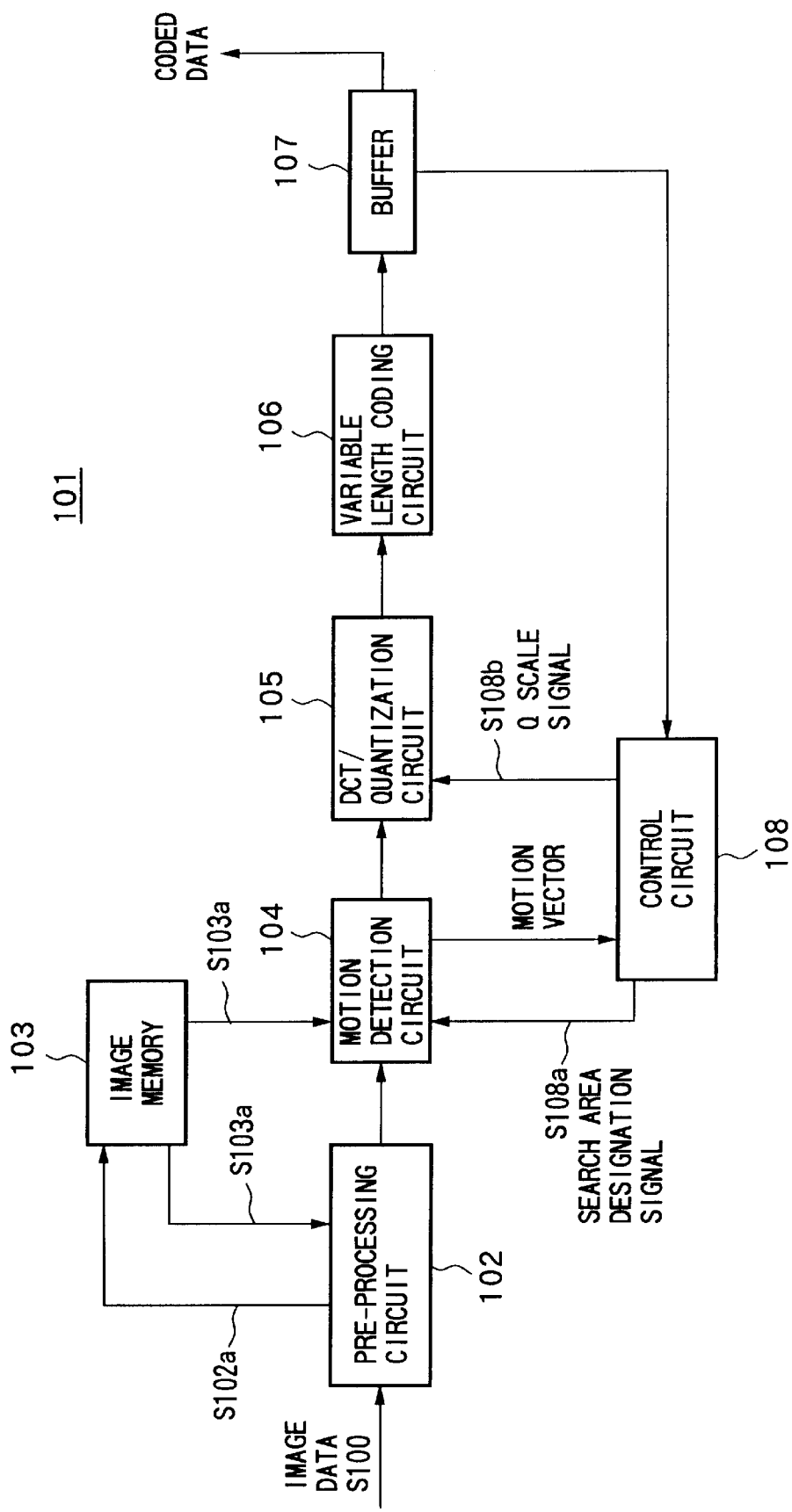

MOTION VECTOR frmvPP BETWEEN P-PICTURES

MOTION VECTOR frmvBP FROM B0-PICTURE TO P1-PICTURE

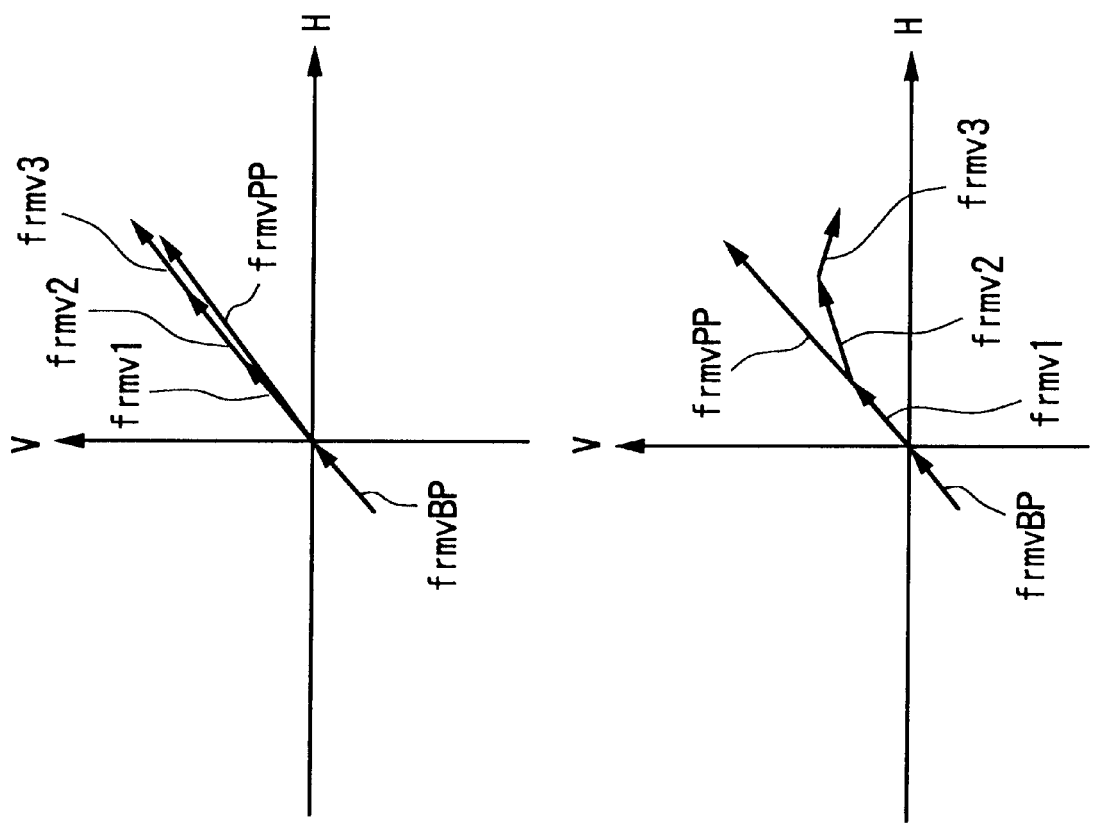

MOTION VECTOR DETECTION APPARATUS, METHOD OF THE SAME, AND IMAGE PROCESSING APPARATUS

BACKGROUND OF THE INVENTION

1. Field of the Invention

The present invention relates to a motion vector detection apparatus and method of the same and to an image processing apparatus.

2. Description of the Related Art

For example, the apparatus shown in FIG. 12 has been known as an image processing apparatus performing image compression and coding.

A pre-processing circuit 102 in an image processing apparatus 101 performs processing for conversion of the image format of image data S100 and outputs image data S102a obtained by the conversion processing to an image memory 103 and a motion detection circuit 104.

The motion detection circuit 104, as shown in FIG. 13, performs motion detection between a prior frame 150 input from the image memory 103 and a present frame 151 input from the pre-processing circuit 102 in units of macroblocks MB of 16×16 pixels within a search area 152 indicated by a search area designation signal S108a input from a control circuit 108 to produce a motion vector 153.

The reason for performing the motion detection on a search area defined in part of an effective screen is that if the motion detection is performed over all of the effective screen, the amount of calculation becomes enormous, the apparatus becomes large in scale, and the processing time becomes long.

The produced motion vector or a residual vector produced using the motion vector is subjected to DCT processing in a DCT/quantization circuit 105 to produce a DCT coefficient. The DCT/quantization circuit 105 quantizes the DCT coefficient using a quantization step indicated by a Q-scale signal S108b input from the control circuit 108, then outputs it to a variable length coding circuit 106.

The quantized DCT coefficient is coded by variable length in the variable length coding circuit 106, then is output through a buffer memory 107 to a recording system or a transmission system.

A method of determining the search area of motion detection by the motion detection circuit 104 by a conventional control circuit 108 will be explained below.

For example in a Moving Picture Experts Group (MPEG) and other moving picture compression systems, in order to compress a series of frames constituting a moving picture using bidirectional prediction, coding is performed by three types of pictures, that is, an intra-coded (I) picture, a predictive-coded (P) picture, and a bidirectional (B) picture. An I-picture is a frame which is obtained by coding an input frame as it is without prediction, a P-picture is a frame using one-directional motion compensation prediction, and a B-picture is a frame using bidirectional prediction.

Within image data S100, as shown in FIG. 14, pictures located in time in the order of B0, P1, B2, B3, and P4 pictures are encoded in the image processing apparatus 100 in the order of the B0, P1, P4, B2, and B3 pictures on the basis of the relationship of previous and following pictures.

Here, B and P indicate the B-picture and P-picture respectively. The numbers following them indicate the order of location in time in the image data.

Conventionally, when the B0 picture is encoded, a motion vector frmvBP from a B0 picture to P2 picture is found in units of macroblocks. Next, when the P4 picture is encoded, since the distance in time between the P1 picture and the P4 picture is three times as long as that between the B0 picture and the P1 picture, assuming that the same motion as the motion vector frmvBP continues, as shown in FIG. 15, a motion vector frmvPP from the P1 picture to the P4 picture is found by tripling the motion vector frmvBP.

In the conventional method described above, for example, as shown in FIG. 16A, when the motion vector frmvBP, the motion vector frmv between the P1 picture and the B2 picture, and the motion vector frmv3 between the B3 picture and the P4 picture are almost the same, that is, when almost the same motion continues, a suitable search area can be set.

Summarizing the problem to be solved by the invention, the method of the related art described above suffered from the problem that when there is a difference between the motion vector frmvBP, motion vector frmv1, motion vector frmv2, and motion vector frmv3, that is, when the motion of the image is severe (rapid), the motion vector frmvPP found by tripling the motion vector frmvBP and the actual motion vector obtained by adding the motion vectors frmv1, frmv2, and frmv3 no longer match, a suitable search area can no longer be set.

SUMMARY OF THE INVENTION

An object of the present invention is to provide a motion vector detection apparatus and method of the same and an image processing apparatus able to determine a suitable search area when detecting a motion vector for a rapid motion image.

According to a first aspect of the present invention, there is provided a motion vector detection apparatus for detecting a motion vector of image data between a plurality of frames, comprising a motion detection circuit specifying image data of a first block matching or almost matching image data of a first block within a first frame in a search area designated within a second frame located before the first frame in time and detecting a motion vector from a positional relationship between the first block of the first frame and the specified first block in the search area of the second frame; a first control circuit specifying the search area by using motion vector of image data found in units of the first blocks between a plurality of frames located before the second frame in time; a simplified motion vector detection circuit detecting a simplified motion vector indicating motion of an image in units of second blocks larger than the first block by using the first frame, the second frame, and a frame located between the first frame and the second frame; a second control circuit specifying the search area by using the simplified motion vector; and a third control circuit judging whether or not a change of motion between the first frame and the second frame is larger than a predetermined standard, designating a search area specified by the second control circuit in the motion detection circuit when the change of motion is larger than the predetermined standard, and designating a search area specified by the first control circuit in the motion detection circuit when the change of motion is not larger than the predetermined standard.

Preferably, the third control circuit finds a cumulative sum of differences which is defined as a cumulative sum of absolute values of differences between simplified motion vectors adjacently located in time within a predetermined section, judges whether or not the cumulative sum of differences is larger than a predetermined standard value, designates the search area specified by the second control circuit in the motion detection circuit when judging the cumulative sum of differences is larger than the standard value, and designates the search area specified by the first control circuit in the motion detection circuit when judging the cumulative sum of differences is not larger than the standard value.

Preferably, the standard value is a fixed multiple of an average value of magnitude of the simplified motion vector detected within the predetermined section.

Alternatively, preferably, the third control circuit finds the cumulative sum of differences by removing from the detected simplified motion vectors in a predetermined section a simplified motion vector having a difference more than a predetermined standard value between average values of two simplified motion vectors located before and after each other adjacent in time.

Preferably, the first control circuit finds a motion vector between the second frame and a third frame located immediately before in time from the second frame in units of the first blocks and specifies the search area by using the motion vector which is found by multiplying the found motion vector by a number defined by a distance of time between the first frame and the second frame.

According to a second aspect of the present invention, there is provided an image processing apparatus for detecting a motion vector of an image between a plurality of frames and compressing the image data by using the motion vector, comprising a motion detection circuit specifying image data of a first block matching or almost matching image data of a first block within a first frame in a search area designated within a second frame located before the first frame in time and detecting a motion vector from a positional relationship between the first block of the first frame and the specified first block in the search area of the second frame; a first control circuit specifying the search area by using motion vector of image data found in units of the first blocks between a plurality of frames located before the second frame in time; a simplified motion vector detection circuit detecting a simplified motion vector indicating motion of an image in units of second blocks larger than the first block by using the first frame, the second frame, and a frame located between the first frame and the second frame; a second control circuit specifying the search area by using the simplified motion vector; a third control circuit judging whether or not a change of motion between the first frame and the second frame is larger than a predetermined standard, designating a search area specified by the second control circuit in the motion detection circuit when the change of motion is larger than the predetermined standard, and designating a search area specified by the first control circuit in the motion detection circuit when the change of motion is not larger than the predetermined standard; and an orthogonal transformation circuit for performing orthogonal transformation on the image data by using the detected motion vector; and a quantization circuit for quantifying the orthogonally transformed image data.

According to a third aspect of the present invention, there is provided a method of motion vector detection for detecting a motion vector of an image between a plurality of frames, comprising the steps of specifying image data of a first block matching or almost matching with image data of the first block within a first frame from a search area designated in a second frame located before the first frame in time and detecting a motion vector from a positional relationship between the first block of the first frame and the specified first block in the search area of the second frame; finding a first search area by using a motion vector of image data found in units of the first blocks between a plurality of frames located before the second frame in time; detecting a simplified motion vector indicating motion of an image in units of second blocks larger than the first block by using the first frame, the second frame, and a frame located between the first frame and the second frame in time; finding a second search area by using the simplified motion vector; and judging whether or not a change of motion between the first frame and the second frame is larger than a predetermined standard based on the detected simplified motion vector, designating the second search area when the change of motion is judged larger than the predetermined standard, and designating a first search area when the change of motion is judged not larger than the predetermined standard.

BRIEF DESCRIPTION OF THE DRAWINGS

These and other objects and features of the present invention will become clearer from the following description of the preferred embodiments given with reference to the accompanying drawings, in which:

FIG. 12 is a view of the configuration of an image processing apparatus of the related art;

FIG. 16A and FIG. 16B are views for explaining the precision of setting the search area shown in FIG. 15 when motion of an image changes and when it does not change.

DESCRIPTION OF THE PREFERRED EMBODIMENTS

Below, an explanation will be given of preferred embodiments of the present invention.

First Embodiment

Figure 1:
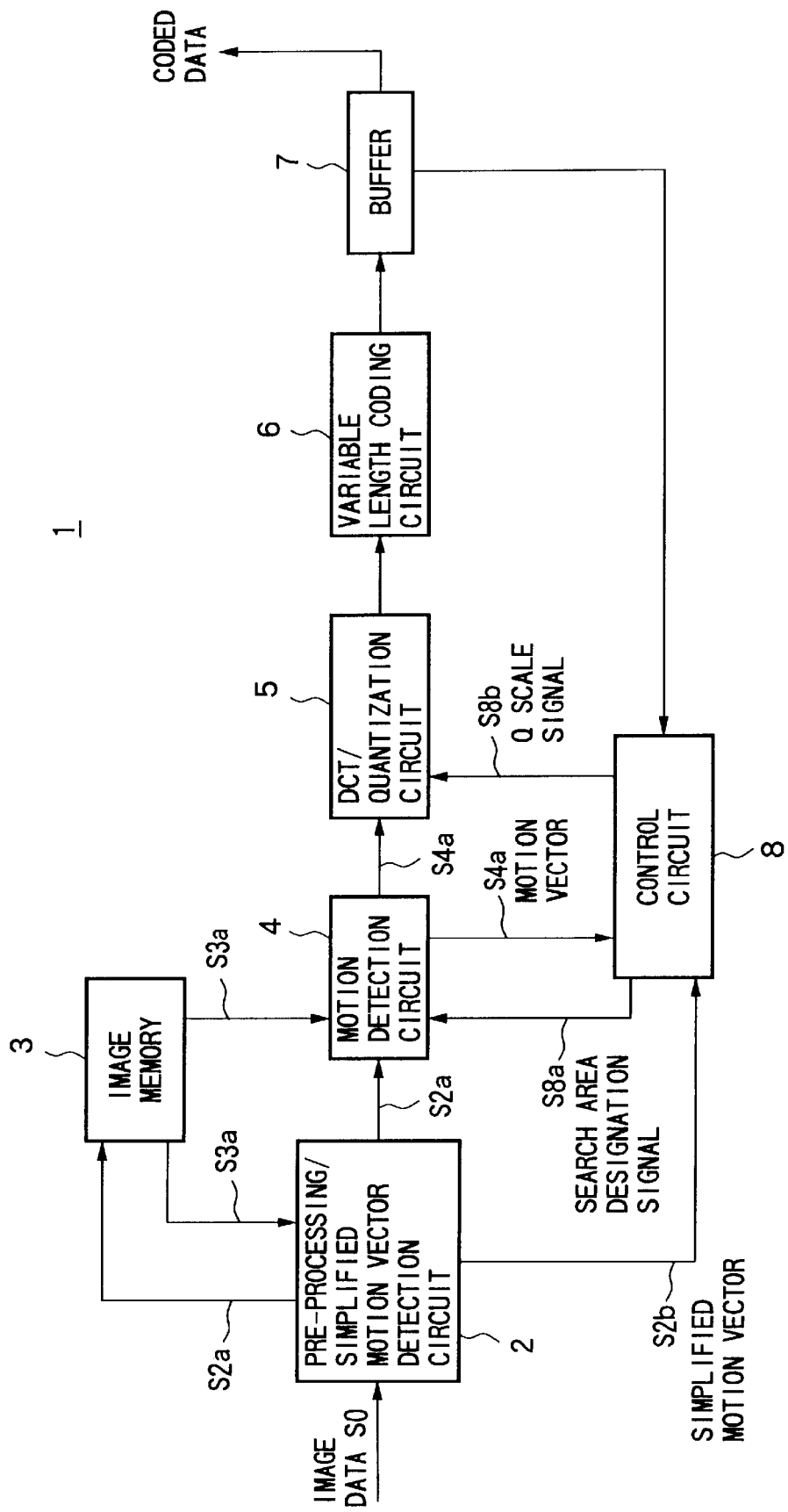
FIG. 1 is a view of the configuration of an image processing apparatus of a first embodiment of the present invention.

FIG. 1 is a view of the configuration of an image processing apparatus 1 of a first embodiment of the present invention.

As shown in FIG. 1, the image processing apparatus 1 comprises a pre-processing/simplified motion vector detection circuit 2, an image memory 3, a motion detection circuit 4, a DCT/quantization circuit 5, a variable length coding circuit 6, a buffer memory 7, and a control circuit 8.

[Pre-processing/Simplified Motion Vector Detection Circuit 2]

The pre-processing/simplified motion vector detection circuit 2 receives as input image data S0 to be coded, performs processing for converting the image format and other pre-processing on the input image data S0 to produce image data S2a, and outputs the image data S2a to the image memory 3 and the motion detection circuit 4.

Further, the pre-processing/simplified motion vector detection circuit 2 produces a simplified motion detection vector S2b of the image data S0 by using the image data S0 and a reference image data S3a (one previous field of image data S0) read from the image memory 3 in units of fields and outputs the simplified motion detection vector S2b to the control circuit 8. Note that in this embodiment, the case is shown, as an example, of the pre-processing/simplified motion vector detection circuit 2 producing the simplified motion vector in units of fields, but it may also do this in units of frames. However, in a case where the image data S0 is of the interlace system, production of the simplified motion vector S2b in units of fields gives a higher detection precision than production of the same in units of frames.

Below, the configuration for producing the simplified motion detection vector S2b by the pre-processing/simplified motion vector detection circuit 2 will be explained.

This configuration finds a simplified motion vector indicating motion in units of fields, which are larger than macroblocks comprising image data of 16×16 pixels, by a simpler configuration than that of the motion detection circuit 4. That is, the simplified motion vector is not directly used for motion compensation, but is used for determining the search area of motion detection performed by the motion detection circuit 4, so a high precision such as one pixel precision is not required.

The pre-processing/simplified motion vector detection circuit 2 finds the vertical direction projection data by using image data of each field and finds the horizontal motion vector from the vertical direction projection data. Further the pre-processing/simplified motion vector detection circuit 2 finds the horizontal direction projection data by using image data of each field and finds the vertical direction projection data from the horizontal direction projection data. Then, the pre-processing/simplified motion vector detection circuit 2 finds the simplified motion vector S2b of each field from the horizontal motion vector and the vertical motion vector.

Figure 2:
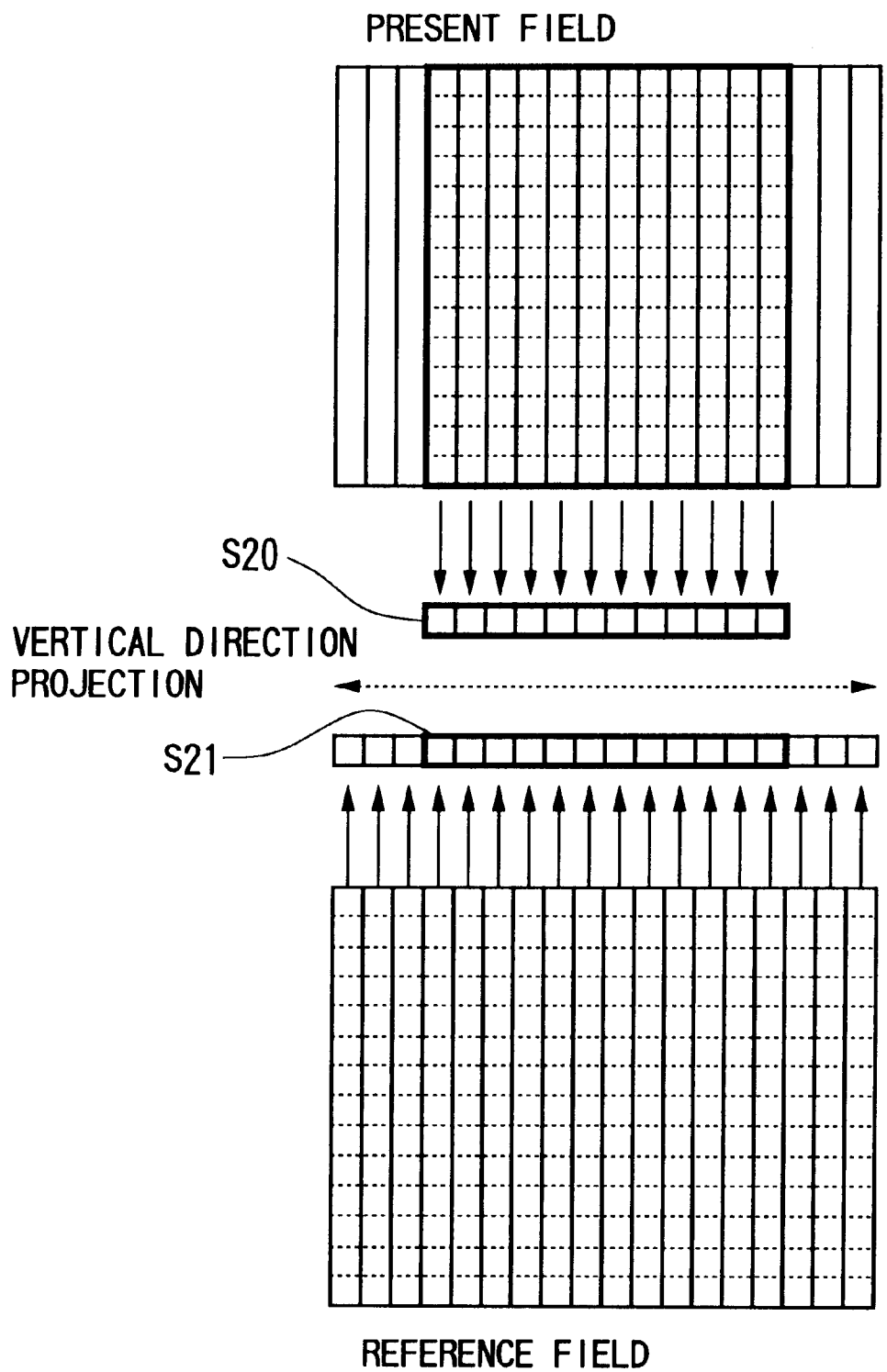
FIG. 2 is a view for explaining a method of producing a horizontal motion vector in the pre-processing/simplified motion vector detection circuit shown in FIG. 1.

FIG. 2 is a view for explaining a method of producing a horizontal motion vector in the pre-processing/simplified motion vector detection circuit 2.

First, the pre-processing/simplified motion vector detection circuit 2 adds all of the pixel data of each vertical line for the portion of the field data of the image data S0 (below also referred to as the present field data) minus the three lines at the two sides to produce the vertical direction projection data S20. The vertical direction projection data S20 is data which the two-dimensional image information of the present field data converted to one-dimensional image information.

Further, the pre-processing/simplified motion vector detection circuit 2 adds all of the pixel data of each vertical line to produce the vertical direction projection data S21 for the reference image data S3a.

The pre-processing/simplified motion vector detection circuit 2 finds the position of the vertical direction projection data S21 of the reference field data best matching the vertical direction projection data S20 of the present field data.

In FIG. 2, the position of the bold box shown in the vertical direction projection data S21 of the reference field data indicates data having a motion vector of zero. In this example, the absolute value sum of the differences of 7 points from "−3" to "+3" is found to find the horizontal motion vector from the position where the sum is smallest. Note that in this embodiment, the horizontal motion vector is found with a precision of one pixel, but the horizontal motion vector may be found in units of 2 or more pixels as well.

Figure 3:
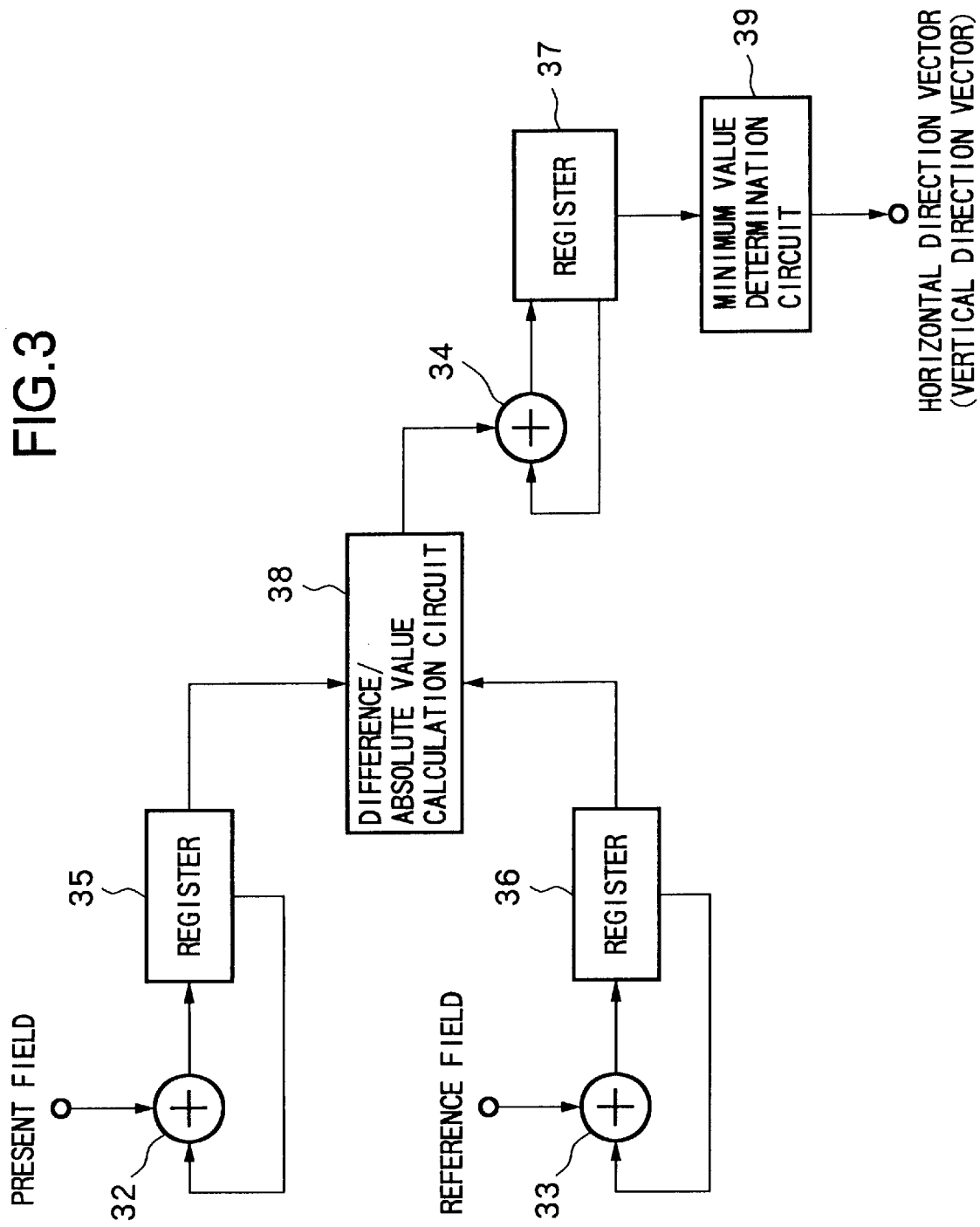
FIG. 3 is a view of the configuration of a horizontal motion vector generation circuit built-in the pre-processing/simplified motion vector detection circuit shown in FIG. 1.

FIG. 3 is a view of the configuration of a horizontal motion vector generation circuit 31 built in the pre-processing/simplified motion vector detection circuit 2.

As shown in FIG. 3, the horizontal motion vector generation circuit 31 comprises addition circuits 32, 33, and 34, registers 35, 36, and 37, a difference/absolute value calculation circuit 38, and minimum value determination circuit 39.

In the horizontal motion vector generation circuit 31, the present field data is input to the addition circuit 32 for every pixel data and, finally, the vertical direction projection data S20 is stored in the register 35. Further, the reference field data is input to the addition circuit 33 for every pixel data and, finally, the vertical direction projection data S21 is stored in the register 36.

The difference/absolute value calculation circuit 38 calculates the absolute value of the difference between the vertical direction projection data S20 and S21 and outputs the absolute value S38 to the addition circuit 34.

The absolute value S38 is successively added and the sum of the absolute values of the differences between the vertical direction projection data S20 and S21 is stored in the register 37.

That is, the horizontal motion vector generation circuit 31 successively changes the position of output of the 12 pixel data to the addition circuit 33 in the reference field data S21 and stores the sum of the absolute values of differences at the positions in the register 37.

Using the minimum value determination circuit 39, the horizontal motion vector is found from the positions of the 12 pixel data of the vertical direction projection data S21 giving the smallest value of the sum of the absolute values of differences.

Figure 4:
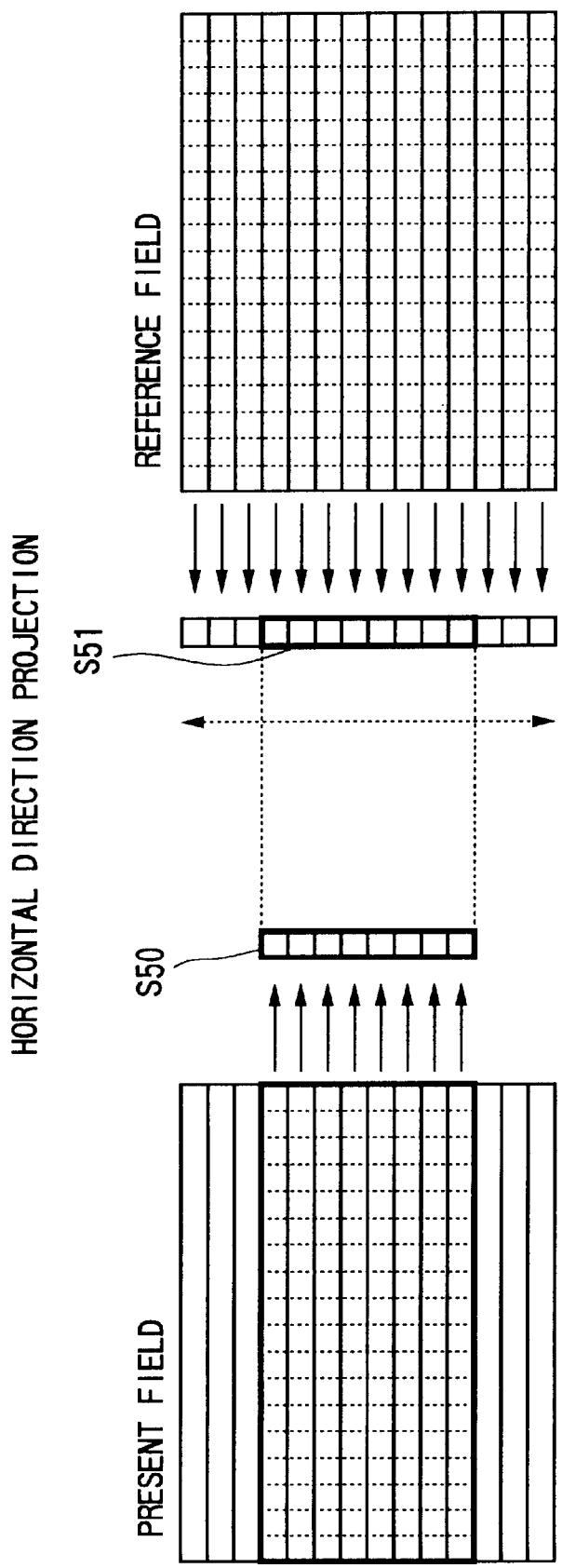
FIG. 4 is a view for explaining a method for producing a vertical motion vector in the pre-processing/simplified motion vector detection circuit shown in FIG. 1.

FIG. 4 is a view for explaining the method for producing the vertical motion vector.

Further, in the production of the vertical motion vector, first, all of the pixel data of each horizontal line is added for the portion of the field data of the image data S0 minus the three lines at the top and bottom to produce the horizontal direction projection data S50.

Further, all of the image data of each horizontal line is added for the reference image data S3a to produce the horizontal direction projection data S51.

Then, the position of the horizontal projection data S51 of the reference field data best matching the horizontal direction projection data S50 of the present field data is found and the vertical motion vector is found from that position.

The configuration of the horizontal motion vector generation circuit built in the pre-processing/simplified motion vector detection circuit 2 is basically the same as that of the horizontal direction vector generation circuit 31 shown in FIG. 3.

[Motion Detection Circuit 4]

The motion detection circuit 4 detects the motion vector between the reference frame data read from the image memory 3 and the present frame data of the image data S2a input from the pre-processing/simplified motion vector detection circuit 2 in units of macroblocks within a search area defined by offset data indicated by a search area designation signal S8a input from the control circuit 8, finds the motion vector S4a in units of frames from the detected motion vector of units of macroblocks, and outputs this motion vector S4a to the DCT/quantization circuit 5 and the control circuit 8.

Figure 5:
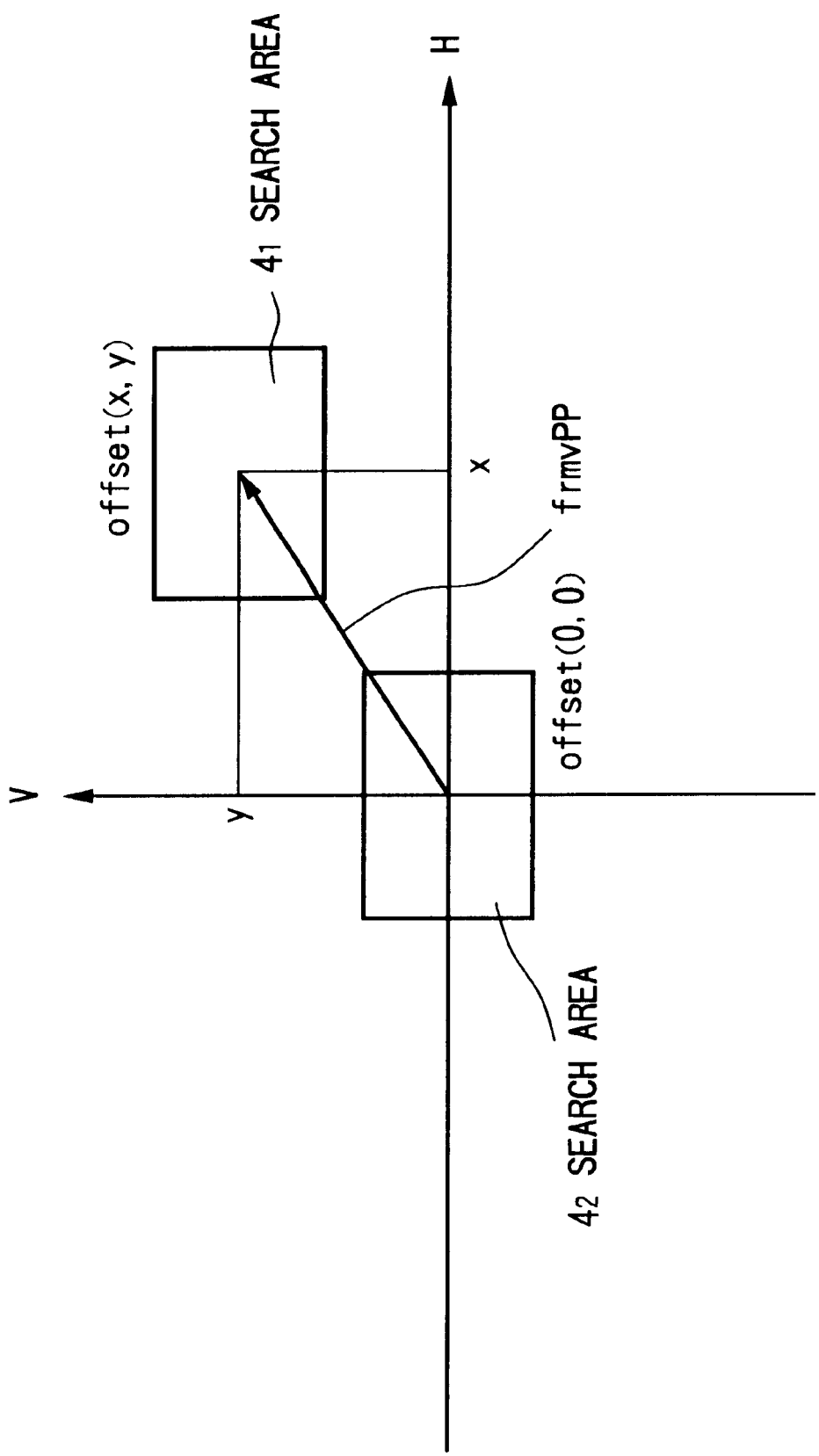
FIG. 5 is a view for explaining a search area used in the motion detection circuit shown in FIG. 1.

The motion detection circuit 4, for example, as shown in FIG. 5, comprises motion detection circuits 4 and 42, performs motion detection within a search area defined by offset data indicated by the search area designation signal S8a described above (center coordinate offset (x,y)) by using the motion detection circuit $4_1$, and performs motion detection within a search area centered on the pixels (center coordinate offset (0,0)) by using the motion detection circuit $4_2$.

[DCT/Quantization Circuit 5]

The DCT/quantization circuit 5 performs DCT processing on a residual vector obtained from the difference between the motion vector S4a input from the motion detection circuit 4 or the present frame data produced by using the motion vector S4a and the reference data, quantizes the DCT coefficient produced by this DCT processing by using the quantization step indicated by the Q-scale signal S8b input from the control circuit 8, and outputs the result to the variable length coding circuit 6.

[Variable Length Coding Circuit 6]

The variable length coding circuit 6 performs variable length coding on the quantized DCT coefficient input from the DCT/quantization circuit 5 and outputs the result via the buffer memory 7 to a recording system or transmission system.

[Control Circuit 8]

The control circuit 8 performs processing for generation of the offset data offset _d of the search area using the motion vector S4a from the motion detection circuit 4 and processing for generation of the offset data offset _p of the search area using the simplified motion vector S2b from the pre-processing/simplified motion vector detection circuit 2, produces the search area designation signal S8a on the basis of the results of the processing, and outputs the result to the motion detection circuit 4.

Further, the control circuit 8 produces a Q-scale signal S8b indicating a quantization step on the basis of the motion vector S4a and the simplified motion vector S2b and outputs it to the DCT/quantization circuit 5.

Specifically, when there is large motion within an image in a target section, the control circuit 8 produces a Q-scale signal S8b indicating a quantication step smaller than that when the motion is small.

Figure 6:
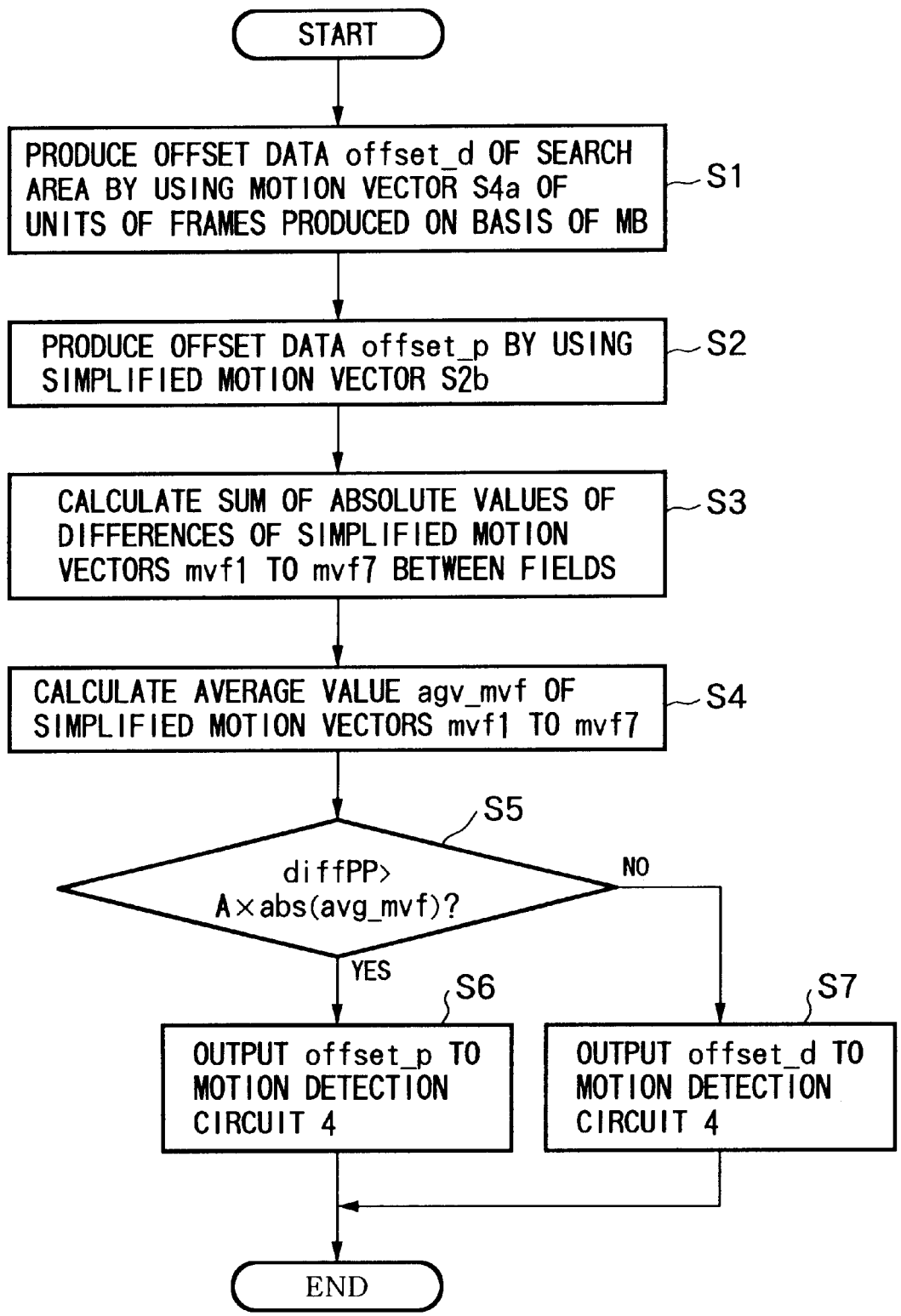
FIG. 6 is a flow chart of the processing of the control circuit shown FIG. 1.

FIG. 6 is a flow chart of the processing of the control circuit 8.

Step 1: The control circuit 8 performs processing for generation of offset data offset_d of a search area by using the motion vector S4a from the motion detection circuit 4.

Figure 14:
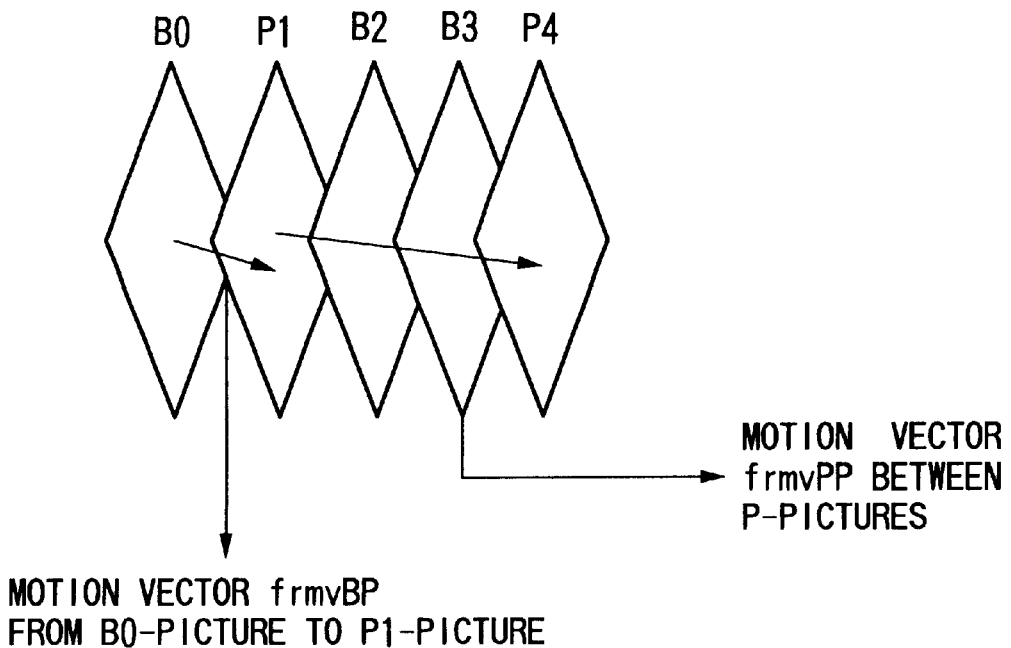
FIG. 14 is a view for explaining image data of the MPEG system.
Figure 15:
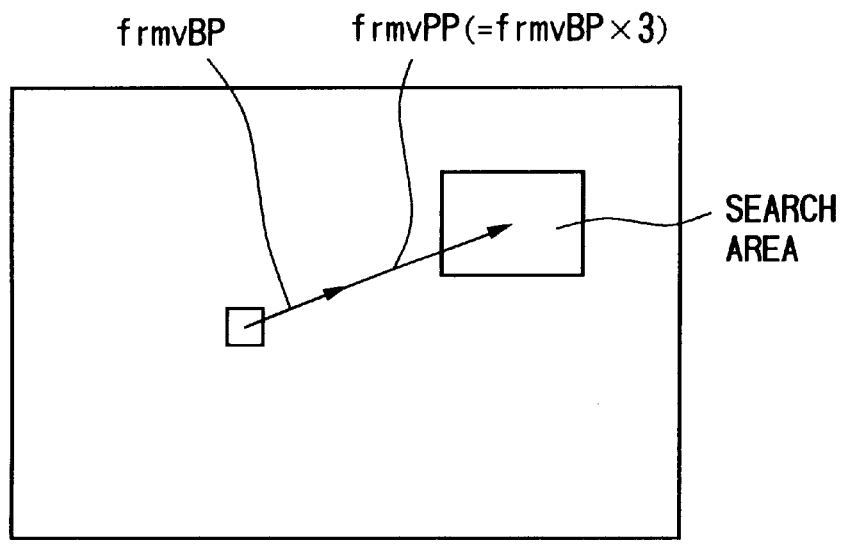
FIG. 15 is a view for explaining the method of setting a search area in the control circuit shown in FIG. 12.

That is, in the same way as the technique explained in the related art, the control circuit 8 for example triples the motion vector S4a (frmvBP) in units of frames from the B0 picture shown in FIG. 14 to the P1 picture to find the motion vector frmvpp from the P1 picture to the P4 picture.

Then, when the motion detection circuit 4 detects the motion of the P4 picture the next time, the control circuit 8 generates offset data offset_d for making the motion vector frmvPP the center of the search area.

Step S2: The control circuit 8 performs processing for generation of offset data offset_p of a search area by using the simplified motion vector S2b from the pre-processing/simplified motion vector detection circuit 2.

Figure 7:
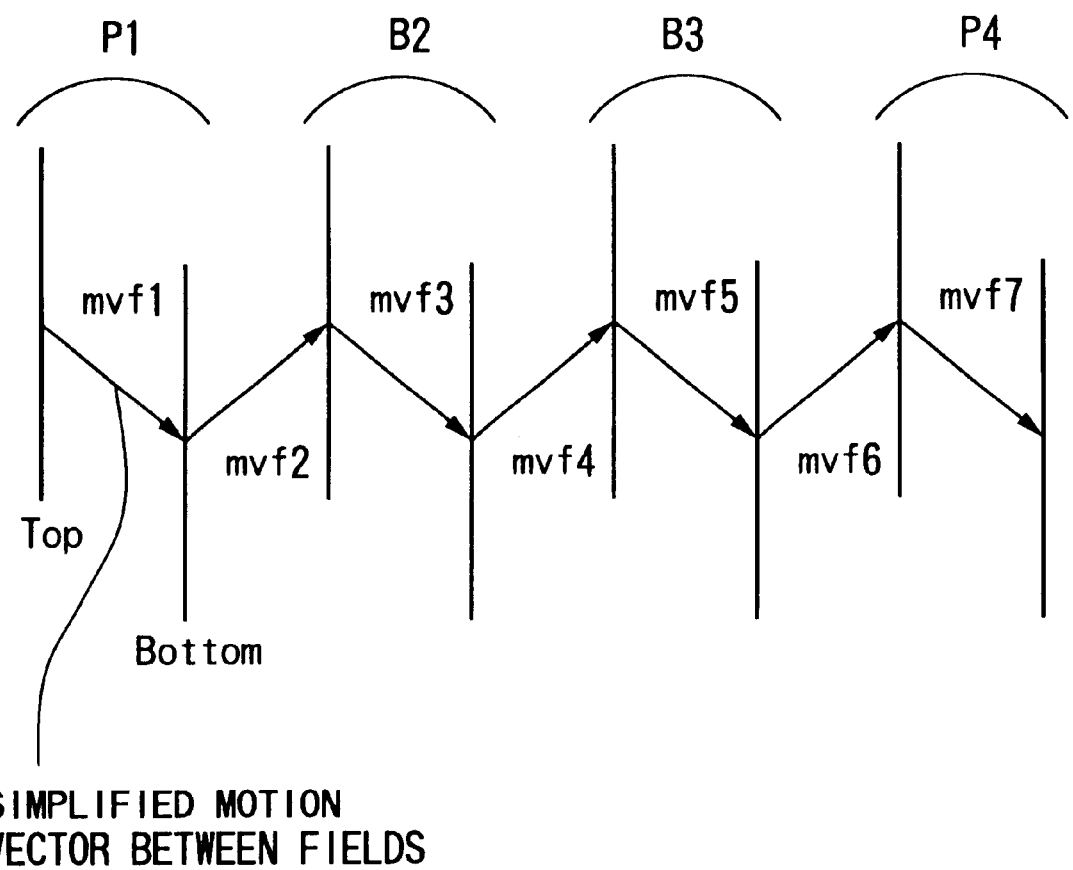
FIG. 7 is a view for explaining the processing of step S2 shown in FIG. 6.

That is, while the pre-processing/simplified motion vector S2b performs the processing from the P1 picture to the P4 picture in units of fields as described in FIG. 7, the control circuit 8 receives as input the simplified motion vectors mvf1, mvf2, mvf3, mvf4, mvf5, mvf6, and mvf7 as the simplified motion vector S2b from the pre-processing/simplified motion vector detection circuit 2.

Then, the control circuit 8 finds the motion vector frmvPP in units of frames, as described below, by using the simplified motion vectors mvf1 to mvf7:

$$frmvPPt=mvf1+mvf2+mvf3+mvf4+mvf5+mvf6 \qquad (1)$$

$$frmvPPb=mvf2+mvf3+mvf4+mvf5+mvf6+mvf7 \qquad (2)$$

$$frmvPP=(frmvPPt+frmvPPb) \qquad (3)$$

Then, when the motion detection circuit 4 detects motion of the P4 picture the next time, the control circuit 8 generates the offset data offset_p for making the motion vector frmvPP the center of the search area.

Step 3: The control circuit 8 finds the differences d1 to d6 of the simplified motion vector adjacent in time for both of the horizontal direction and the vertical direction as shown in FIG. 8A by using the simplified motion vectors mvf1 to mvf7 input as the simplified motion vector S2b from the pre-processing/simplified motion vector detection circuit 2 and the adds absolute values of the differences d1 to d6 to calculate the sum of the absolute values of the differences diffPP.

$$diffPP=|d1|+|d2|+|d3|+|d4|+|d5|+|d6|\,| \qquad (4)$$

Figure 8:
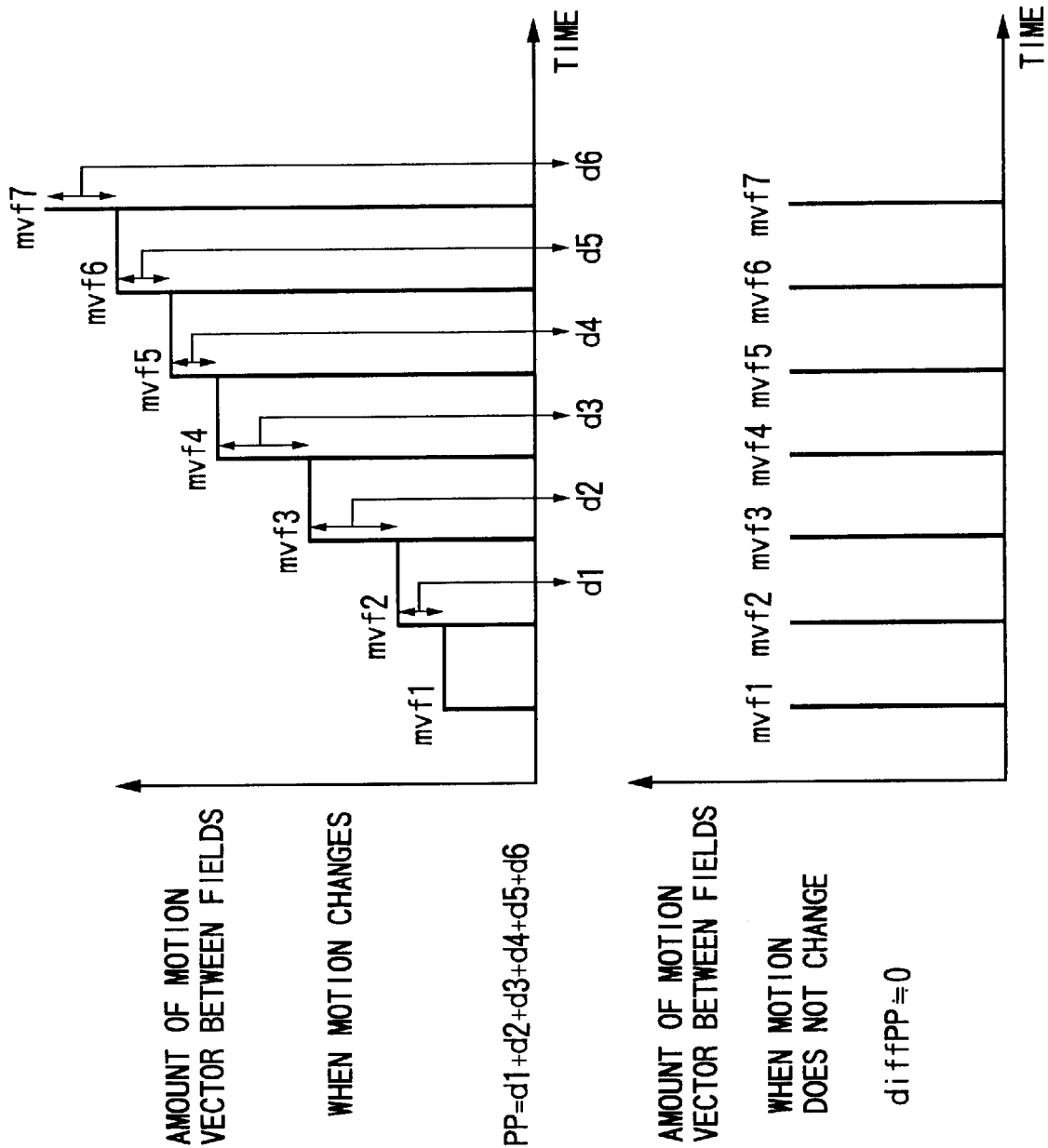
FIG. 8A and FIG. 8B are views for explaining the processing of step S3 shown in FIG. 6.

In this case, the value of the sum of the absolute values of the differences diffPP, within a target section, becomes large as shown in FIG. 8A when there is a change in the simplified motion vector and becomes small as shown in FIG. 8B when there is no change in the simplified motion vector.

Step S4: The control circuit 8 calculates an average value avg_mvf on the basis of equation (5) described below by using the simplified motion vectors mvf1 to mvf7 input as the simplified motion vector S2b from the pre-processing/simplified motion vector 2.

$$avg\_mvf=(mvf1+mvf2+mvf3+mvf4+mvf5+mvf6+mvf7)/7 \qquad (5)$$

Step 5: The control circuit 8 judges whether or not the sum of the absolute values of the differences diffPP is larger than A (constant) times the absolute value abs (avg_mvf) of the average value avg_mvf calculated at step S4, executes processing of step S6 when judging the sum of the absolute values of the differences is larger, and executes processing of step S7 when judging the sum not to be larger.

That is, the control circuit 8 executes the processing of step S6 when the motion of the image within the target section is severe (fast) and executes the processing of step S7 when the motion of the image is slow.

Here, the constant A is for example determined by finding in advance the relationship between the average value avg_mvf, the search area determined by using the motion vector S4a, and the search area determined by using the simplified motion vector S2b and so as to enable setting of a suitable search area.

Step S6: The control circuit 8 outputs the search area designation signal S8a indicating the offset data offset_p produced in step S2 to the motion detection circuit 4.

Step S7: The control circuit 8 outputs the search area designation signal S8a indicating the offset data offset_d produced in step S1 to the motion detection circuit 4.

Below, the overall operation of the image processing apparatus 1 will be explained.

First, the pre-processing/simplified motion vector detection circuit 2 performs processing for converting the image format of the image data S0 and outputs the processed image data S2a to the image memory 3 and the motion detection circuit 4.

Further, the pre-processing/simplified motion vector detection circuit 2, as described above, for example, produces the simplified motion vector S2b of the image data S0 in units of fields by using the image data S0 and the reference image data S3a (one previous field of the image data S0) read from the image memory 3 and outputs the simplified motion vector S2b to the control circuit 8.

The motion detection circuit 4 detects the motion vector between the reference image data S3a (reference frame data) read from the image memory 3 and the image data (present frame data) input from the pre-processing/simplified motion vector detection circuit 2 in units of macroblocks within a search area defined by the offset data indicated by the search area designation signal S8a input from the control circuit 8 and outputs the detected motion vector S4a to the DCT/quantization circuit 5 and the control circuit 8.

Next, the control circuit 8, through the procedure shown in FIG. 6 described above, performs processing for generation of the offset data offset_d of the search area by using the motion vector S4a from the motion detection circuit 4 and processing for generation of the offset data offset_p of the search area by using the simplified motion vector S2b from the pre-processing/simplified motion vector detection circuit 2 and outputs the search area designation signal S8a on the basis of the processing results to the motion detection circuit 4.

Further, the control circuit 8 generates a Qscale signal S8b indicating the quantization step on the basis of the motion vector S4a and the simplified motion vector S2b and outputs it to the DCT/quantization circuit 5.

Next, the DCT/quantization circuit 5 performs DCT on the residual vector obtained from the difference between the motion vector S4a input from the motion detection circuit 4 or the present frame data produced by using the motion vector S4a and the reference frame data, quantizes the DCT coefficient produced by the DCT processing by using the quantization step indicated by the Q-scale signal S8b input from the control circuit 8, and outputs the same to the variable length coding circuit 6.

Next, the variable length coding circuit 6 performs variable length coding on the quantified DCT coefficient input from the DCT/quantization circuit 5 and outputs the result via the buffer memory 7 to a recording system or transmission system.

As described above, according to the image processing apparatus 1, the control circuit 8 sets the search area of the motion detection circuit 4 on the basis of the offset data offset_p produced by using the simplified motion vector S2b simply tracking the change of motion of all fields when the change of the simplified motion vector within the target section is rapid and sets the search area of the motion detection circuit 4 on the basis of the offset data offset_d produced by using the motion vector S4a produced in units of macroblocks in the same way as the past when the change of the simplified motion vector within the target section is slow.

As a result, according to the image processing apparatus 1, the search area can be suitably set even for an image having rapid motion and therefore an image having a higher quality compared with the related art can be obtained. Further, according to the image processing apparatus 1, an image having a high quality can be obtained in the same way as the related art for an image having slow motion.

Second Embodiment

Figure 9:
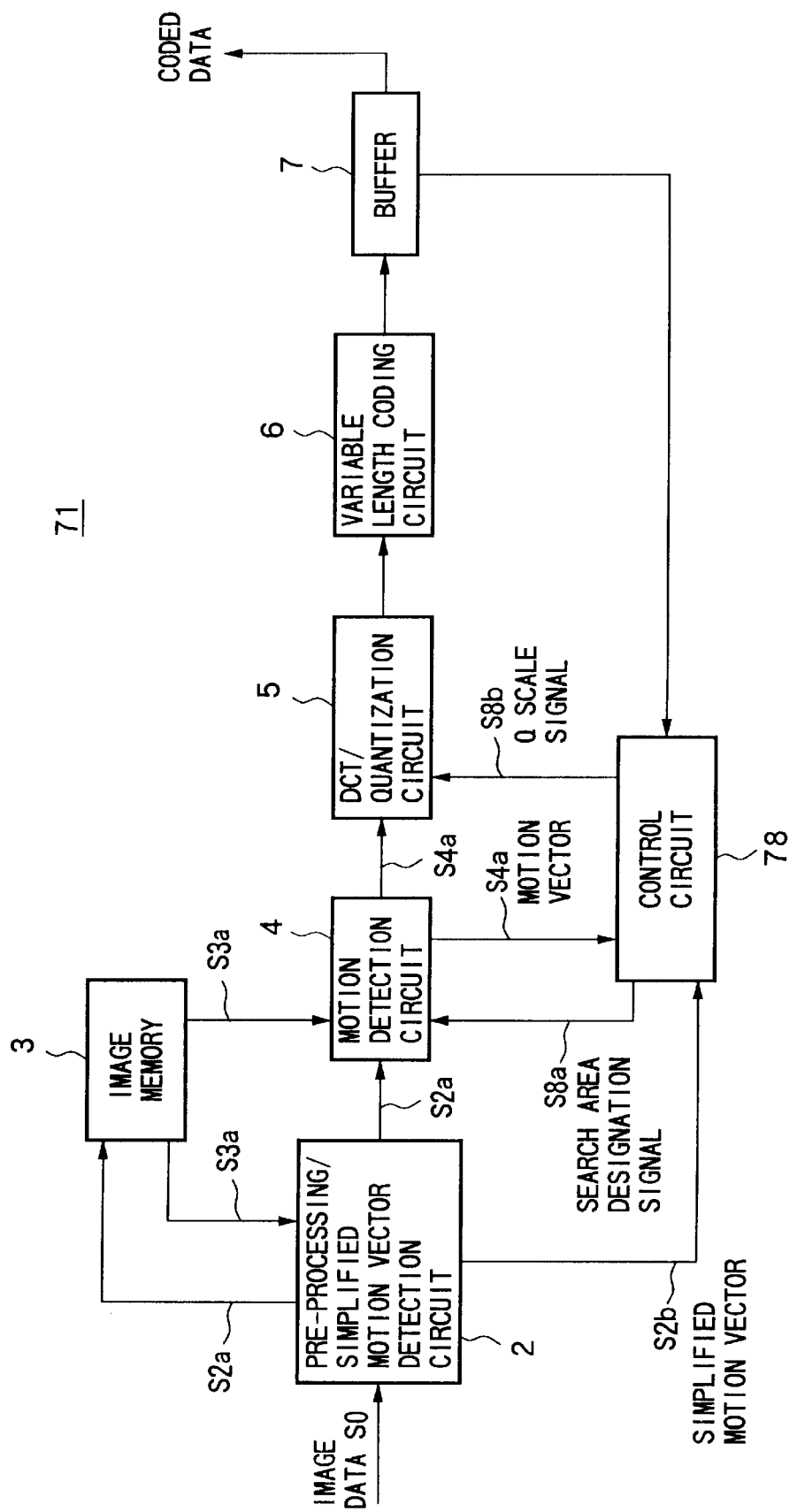
FIG. 9 is a view of the configuration of an image processing apparatus of a second embodiment of the present invention.

FIG. 9 is a view of the configuration of an image processing apparatus 71 of a second embodiment of the present invention.

As described in FIG. 9, the image processing apparatus 71 comprises a pre-processing/simplified motion vector detection circuit 2, an image memory 3, a motion detection circuit 4, a DCT/quantization circuit 5, a variable length coding circuit 6, a buffer memory 7, and a control circuit 78.

In FIG. 9, components given the same references as with FIG. 1 are the same as components of the same references described in the first embodiment.

That is, the pre-processing/simplified motion vector detection circuit 2, the image memory 3, the motion detection circuit 4, the DCT/quantization circuit 5, the variable length coding circuit 6, and the buffer memory 7 are the same as described in the first embodiment.

The present embodiment is characterized in the control circuit 78.

Specifically, the control circuit 78 is characterized in the sum of the absolute values of the differences diffPP of step S3 shown in FIG. 6. The result of the processing is the same as with the processing of the control circuit 8 of the first embodiment described above.

That is, in the control circuit 8 of the first embodiment described above, when error occurred in the processing for generating the simplified motion vector S2b by the pre-processing/simplified motion vector detection circuit 2 and the simplified motion vectors mvf1 to mvf7 change tremendously, the sum of the absolute values of the differences diffPP becomes larger in accordance with the change. Despite the fact that the fluctuation is actually small, the processing of step S6 is selected at step S5 shown in FIG. 6, so the search area of the motion detection circuit 4 is set on the basis of the offset data offset_d found by using wrong motion vector S4a.

In the present embodiment, in order to avoid the occurrence of such a case, the sum of the absolute values of the differences diffPP is calculated by using the simplified motion vector S2b (mvf1 to mvf7) from the pre-processing/simplified motion vector detection circuit 2 as described below.

Figure 10:
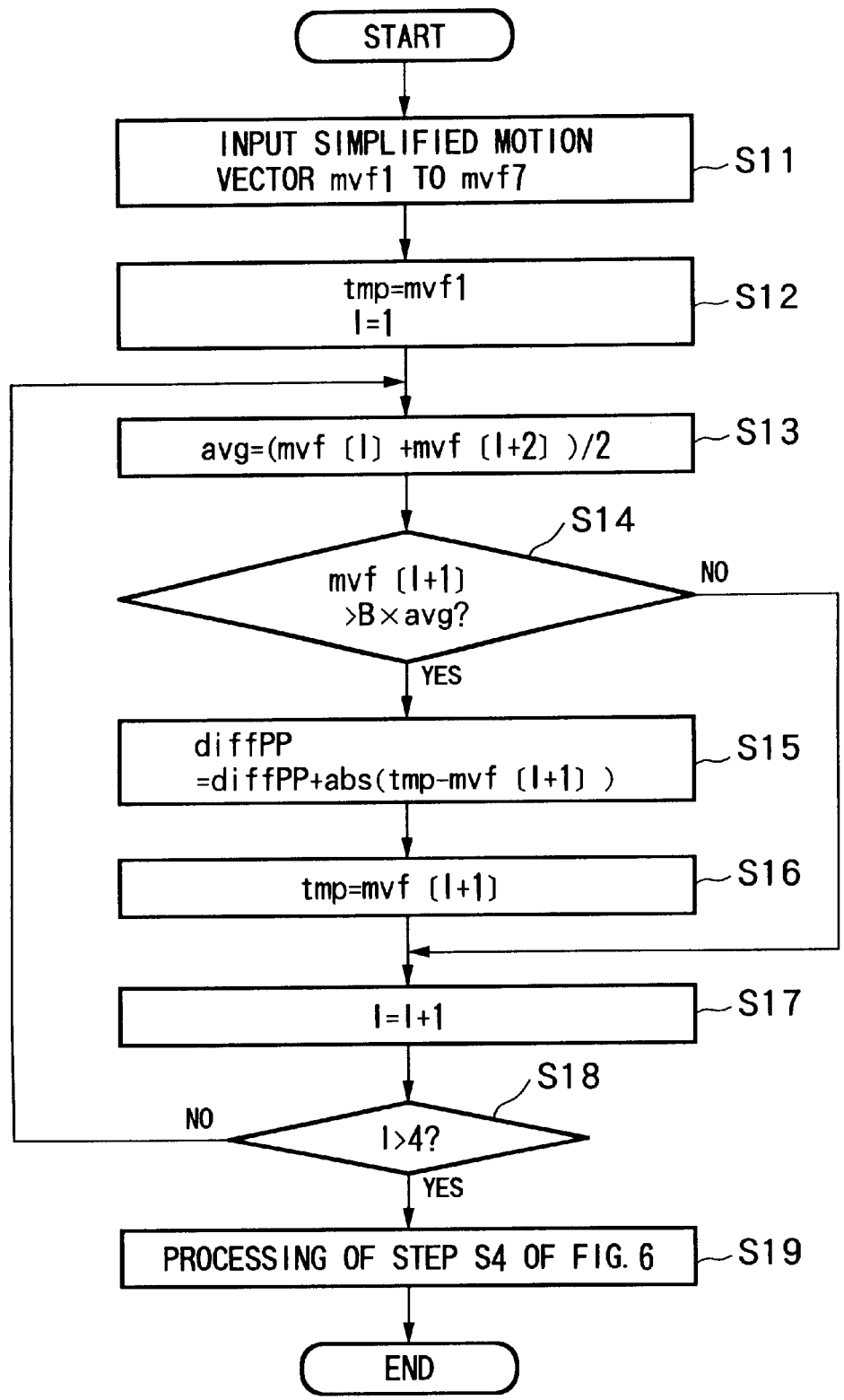
FIG. 10 is a flow chart of the processing of the control circuit shown in FIG. 9.

FIG. 10 is a flow chart for explaining the method of calculation of the sum of the absolute values of the differences diffPP by the control circuit 78.

Step S11: The control circuit 78 inputs the simplified motion vectors mvf1 to mvf7 as the simplified motion vector S2b from the pre-processing/simplified motion vector detection circuit 2.

Step S12: The control circuit 78 sets the simplified motion vector mvf1 to the temporary vector tmp and sets the initial value "1" for the "1".

Step S13: The control circuit 78 calculates the average value avg among the simplified motion vectors mvf[I] and [I+2].

Step S14: The control circuit 78 compares the simplified motion vector mvf[I+1] and "Bxavg" obtained by multiplying the average value avg calculated at step S13 by B (constant), executes the processing of step S15 when the simplified motion vector mvf[I+1] is larger, and executes the processing of step S17 when otherwise.

Here, the constant B is determined so as to enable setting of a suitable search area stably on the basis of predetermined experimental data etc.

Step S15: The control circuit 78 performs the calculation of equation (6) described below to update the sum of the absolute values of the differences diffPP.

$$diffPP=diffPP+abs(tmp-mvf[I+1]) \qquad (6)$$

Step S16: The control circuit 78 sets the simplified motion vector mvf[I+1] to the temporary vector tmp.

Step S17: The control circuit 78 increases the Step S18: The control circuit 78 judges whether or not the "I" is larger than "4", returns to the processing of step S13 when judging it is not larger, and executes the processing of step S19 when judging it is larger.

Step S19: The control circuit 78 determines the final sum of absolute values of the differences diffPP and performs the processing of step S4 shown in FIG. 6.

Figure 11A:
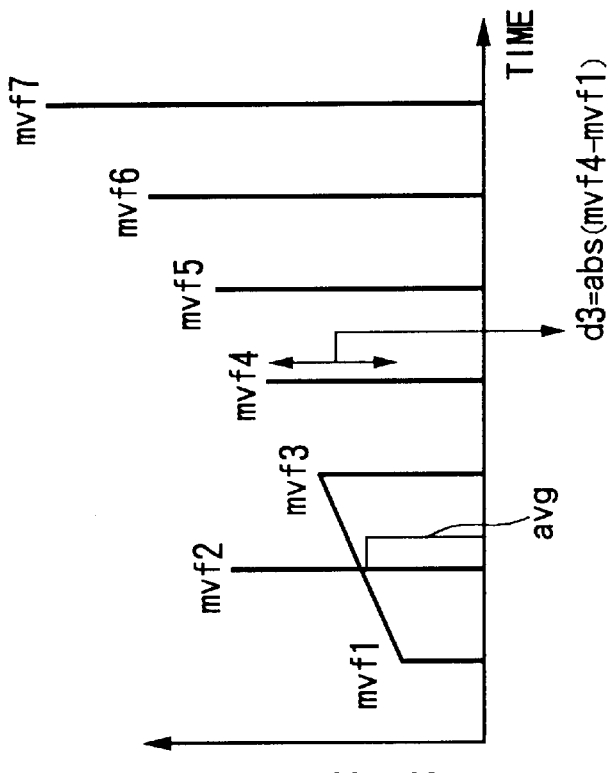
FIG. 11A and FIG. 11B are views for explaining the processing of the control circuit shown in FIG. 10.

The control circuit 78, for example, as shown in FIG. 11A, performs the processing of step S17 after step S14 shown in FIG. 10 in the case of I=1,2 when inputting the simplified motion vectors mvf1 to mvf7, including the simplified motion vector in which error has occurred, does not add the differences (mvf2−mvf1) and (mvf3−mvf2) of the motion vector to the sum of the absolute values of the differences diffPP, and, in the case of I=3, performs the processing of step S15 after step S14 shown in FIG. 10 and adds the difference (mvf4−mvf1) of the motion vector to the sum of the absolute values of the differences diffPP.

Figure 11B:
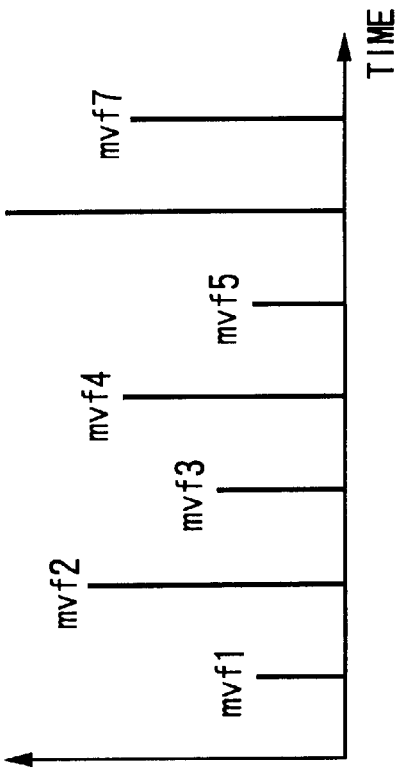
Figure 13:
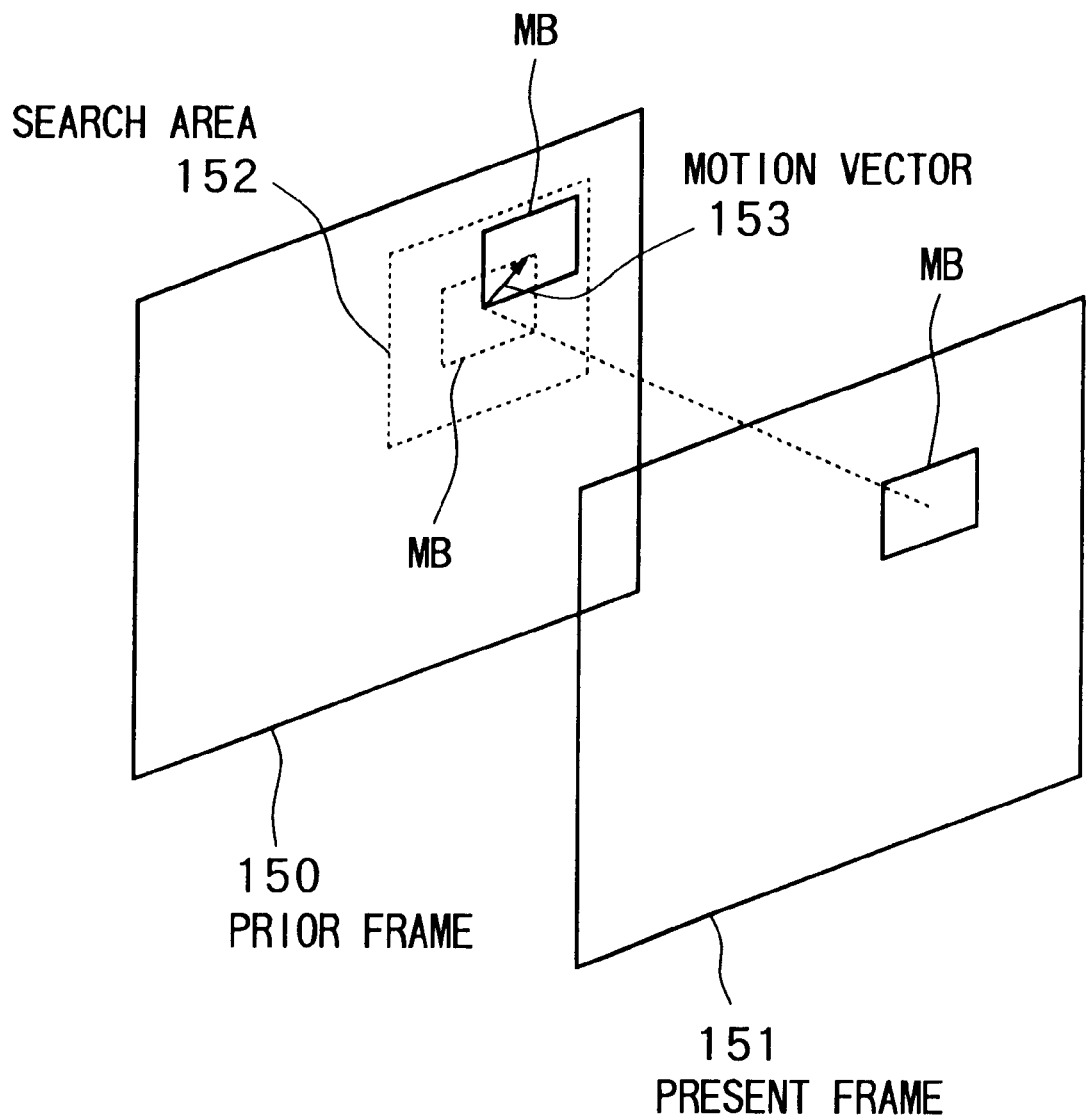
FIG. 13 is a view for explaining a search area of the motion detection circuit shown in FIG. 12.

Further, in the control circuit 78, as shown in FIG. 11B, the sum of the absolute values of the differences diffPP becomes approximately zero when errors have occurred in almost all the simplified motion vectors.

As a result, the processing of step S7 is performed after step S5 shown in FIG. 6. In the same way as in the related art, the search area of the motion detection circuit 4 is set on the basis of the offset data offset_d produced by using the motion vector S4a found in units of macroblocks.

As described above, according to the image processing apparatus 71, the search area of the motion detection circuit 4 can be suitably determined even when error has occurred in the processing for generation of the simplified motion vector S2b by the pre-processing/simplified motion vector detection circuit 2.

The present invention is not limited to the embodiments described above.

For example, in the above embodiments, the case of using image data of 16×16 pixels as macroblocks was explained as an example, however it is also possible to use for example macroblocks comprising image data of 8×8 or 32×32 pixels.

Summarizing the effects of the invention, as described above, according to the motion vector detection apparatus, method of the same, and image processing apparatus of the present invention, a suitable search area can be determined when detecting motion vectors for both images having rapid motion and images having slow motion.

As a result, the image compression processing can be performed effectively and correctly.

While the invention has been described with reference to specific embodiment chosen for purpose of illustration, it should be apparent that numerous modifications could be made thereto by those skilled in the art without departing from the basic concept and scope of the invention.

What is claimed is:

1. A motion vector detection apparatus for detecting a motion vector of image data between a plurality of frames, comprising:
a motion detection circuit specifying image data of a first block matching or almost matching image data of a first block within a first frame in a before area designated within a second frame located after the first frame in time and detecting a motion vector from a positional relationship between the first block of the first frame and the specified first block in the search area of the second frame;
a first control circuit specifying the search area by using motion vector of image data found in units of said first blocks between a plurality of frames located before said second frame in time;
a simplified motion vector detection circuit detecting a simplified motion vector indicating motion of an image in units of second blocks larger than said first block by using said first frame, said second frame, and a frame located between said first frame and said second frame;
a second control circuit specifying said search area by using said simplified motion vector; and
a third control circuit judging whether or not a change of motion between said first frame and said second frame is larger than a predetermined standard, designating a search area specified by said second control circuit in said motion detection circuit when the change of motion is larger than the predetermined standard, and designating a search area specified by said first control circuit in said motion detection circuit when the change of motion is not larger than the predetermined standard.

2. A motion vector detection apparatus as set forth in claim 1, wherein
said third control circuit finds a cumulative sum of differences which is defined as a cumulative sum of absolute values of differences between simplified motion vectors adjacently located in time within a predetermined section, judges whether or not the cumulative sum of differences is larger than a predetermined standard value, designates the search area specified by said second control circuit in said motion detection circuit when judging the cumulative sum of differences is larger than said standard value, and designates the search area specified by said first control circuit in said motion detection circuit when judging the cumulative sum of differences is not larger than said standard value.

3. A motion vector detection apparatus as set forth in claim 2, wherein
said standard value is a fixed multiple of an average value of magnitude of the simplified motion vector detected within said predetermined section.

4. A motion vector detection apparatus as set forth in claim 2, wherein
said third control circuit finds said cumulative sum of differences by removing from the detected simplified motion vectors in a predetermined section a simplified motion vector having a difference more than a predetermined standard value between average values of two simplified motion vectors located before and after each other adjacent in time.

5. A motion vector detection apparatus as set forth in claim 1, wherein
said first control circuit finds a motion vector between said second frame and a third frame located immediately before in time from said second frame in units of said first blocks and specifies said search area by using the motion vector which is found by multiplying the found motion vector by a number defined by a distance of time between said first frame and said second frame.

6. A motion vector detection apparatus as set forth in claim 1, wherein
said simplified motion vector detection circuit comprises:
a horizontal direction vector calculation circuit for calculating a horizontal direction vector;
a vertical direction vector calculation circuit for calculating a vertical direction vector; and
a simplified motion vector calculation circuit for calculating a simplified motion vector from said horizontal direction vector and said vertical direction vector;
said horizontal direction vector calculation circuit comprises:
a first addition circuit for adding pixel data of a predetermined range of the horizontal direction in a vertical direction among pixel data of a first field to calculate first addition data;
a second addition circuit for adding pixel data of a predetermined range of the horizontal direction in a vertical direction among pixel data of a second field following said first field to calculate second addition data;
a first difference absolute value calculation circuit for calculating an absolute value of a difference between said first addition data and said second addition data for pixel data of the corresponding location in the horizontal direction;
a third addition circuit for adding said absolute value for a predetermined range in said horizontal direction to calculate a third addition data; and
a first minimum value specifying circuit for specifying a minimum third addition data among a plurality of said third addition data produced by shifting said predetermined range of the horizontal direction used by said second addition circuit and finding said horizontal direction vector from said predetermined range used by said second addition circuit for finding the specified third addition data; and
said vertical direction vector calculation circuit comprises:
a fourth addition circuit for adding pixel data of a predetermined range in the vertical direction in a horizontal direction among pixel data of said first field to calculate fourth addition data;
a fifth addition circuit adding pixel data of a predetermined range in the vertical direction in a horizontal direction among pixel data of said second field to calculate fifth addition data;
a second difference absolute value calculation circuit for calculating an absolute value of the difference between said fourth addition data and said fifth addition data for pixel data of the corresponding location in the vertical direction;
a sixth addition circuit for adding said absolute value for a predetermined range in said vertical direction to calculate a sixth addition data; and
a second minimum value specifying circuit for specifying a minimum sixth addition data among a plurality of said sixth addition data produced by shifting said predetermined range of vertical direction used by said fifth addition circuit and finding said vertical direction vector from said predetermined range used by said fifth addition circuit for finding the determined sixth addition data.

7. A motion vector detection apparatus as set forth in claim 1, wherein
said first block comprises a macroblock, and
said second block comprises a frame or field.

8. An image processing apparatus for detecting a motion vector of an image between a plurality of frames and compressing the image data by using the motion vector, comprising:
a motion detection circuit specifying image data of a first block matching or almost matching image data of a first block within a first frame in a search area designated within a second frame located before said first frame in time and detecting a motion vector from a positional relationship between said first block of said first frame and the specified first block in the search area of said second frame;
a first control circuit specifying said search area by using motion vector of image data found in units of said first blocks between a plurality of frames located before said second frame in time;
a simplified motion vector detection circuit detecting a simplified motion vector indicating motion of an image in units of second blocks larger than said first block by using said first frame, said second frame, and a frame located between said first frame and said second frame;
a second control circuit specifying said search area by using said simplified motion vector;
a third control circuit judging whether or not a change of motion between said first frame and said second frame is larger than a predetermined standard, designating a search area specified by said second control circuit in said motion detection circuit when the change of motion is larger than the predetermined standard, and designating a search area specified by said first control circuit in said motion detection circuit when the change of motion is not larger than the predetermined standard; and
an orthogonal transformation circuit for performing orthogonal transformation on said image data by using the detected motion vector; and
a quantization circuit for quantifying said orthogonally transformed image data.

9. An image processing apparatus set forth in claim 8, wherein
said third control circuit finds a cumulative sum of differences which is defined as a cumulative sum of absolute values of differences between simplified motion vectors adjacently located in time within a predetermined section, judges whether or not the cumulative sum of differences is larger than a predetermined standard value, designates the search area specified by said second control circuit in said motion detection circuit when judging the cumulative sum of differences is larger than said standard value, and designates the search area specified by said first control circuit in said motion detection circuit when judging the cumulative sum of differences is not larger than said standard value.

10. An image processing apparatus set forth in claim 9, wherein
said standard value is a fixed multiple of an average value of a magnitude of the simplified motion vector detected within said predetermined section.

11. An image processing apparatus set forth in claim 9, wherein
said third control circuit finds said cumulative sum of differences by removing from the detected simplified motion vectors in a predetermined section a simplified motion vector having a difference more than a predetermined standard value between average values of two simplified motion vectors located before and after each other adjacent in time.

12. An image processing apparatus set forth in claim 8, wherein
said second control circuit determines a quantization step of said quantization circuit by using said simplified motion vector.

13. An image processing apparatus set forth in claim 8, wherein
said first control circuit finds a motion vector between said second frame and a third frame located immediately before in time from said second frame in units of said first blocks and specifies said search area by using the motion vector found by multiplying the found motion vector by a number defined by a distance of time between said first frame and said second frame.

14. An image processing apparatus set forth in claim 8, wherein
said first block comprises a macroblock, and
said second block comprises a frame or field.

15. A method of motion vector detection for detecting a motion vector of an image between a plurality of frames, comprising the steps of:
specifying image data of a first block matching or almost matching with image data of the first block within a first frame from a search area designated in a second frame located before said first frame in time and detecting a motion vector from a positional relationship between said first block of said first frame and the specified first block in said search area of said second frame;
finding a first search area by using a motion vector of image data found in units of said first blocks between a plurality of frames located before said second frame in time;
detecting a simplified motion vector indicating motion of an image in units of second blocks larger than said first block by using said first frame, said second frame, and a frame located between said first frame and said second frame in time;
finding a second search area by using said simplified motion vector; and
judging whether or not a change of motion between said first frame and said second frame is larger than a predetermined standard based on the detected simplified motion vector, designating the second search area when the change of motion is judged larger than the predetermined standard, and designating a first search area when the change of motion is judged not larger than the predetermined standard.

16. A method of motion vector detection as set forth claim 15, further comprising the step of:
finding a cumulative sum of absolute values of differences between simplified motion vectors adjacently located in time, that is, a cumulative sum of differences, for a simplified motion vector detected in a predetermined section, judging whether or not the cumulative sum of differences is larger than a predetermined standard value, designating said second search area when the difference cumulative value is judged larger than said standard value, and designating said first search area when the difference cumulative value is judged not larger than said standard value.

17. A method of motion vector detection as set forth claim 16, wherein
said standard value is a fixed multiple of an average value of a magnitude of the simplified motion vector detected within said predetermined section.

* * * * *